US012043921B2

(12) United States Patent
Sui et al.

(10) Patent No.: US 12,043,921 B2
(45) Date of Patent: Jul. 23, 2024

(54) METHOD FOR PREPARING A FIBER WITH SPATIAL STRUCTURE, THE FIBER PREPARED THEREBY AND ITS USE

(71) Applicant: QINGDAO UNIVERSITY, Qingdao (CN)

(72) Inventors: Kunyan Sui, Qingdao (CN); Na Pan, Qingdao (CN); Huilin Cui, Qingdao (CN); Min Lin, Qingdao (CN); Yeqiang Tan, Qingdao (CN); Wenxin Fan, Qingdao (CN)

(73) Assignee: QINGDAO UNIVERSITY, Qingdao (CN)

( * ) Notice: Subject to any disclaimer, the term of this patent is extended or adjusted under 35 U.S.C. 154(b) by 661 days.

(21) Appl. No.: 17/280,877

(22) PCT Filed: Jul. 30, 2019

(86) PCT No.: PCT/CN2019/098432
§ 371 (c)(1),
(2) Date: Mar. 27, 2021

(87) PCT Pub. No.: WO2020/063094
PCT Pub. Date: Apr. 2, 2020

(65) Prior Publication Data
US 2021/0404092 A1   Dec. 30, 2021

(30) Foreign Application Priority Data

Sep. 30, 2018 (CN) .......................... 201811157406.5
Sep. 30, 2018 (CN) .......................... 201811158575.0

(51) Int. Cl.
*D01D 5/06* (2006.01)
*D01D 5/24* (2006.01)
(Continued)

(52) U.S. Cl.
CPC ................. *D01D 5/06* (2013.01); *D01D 5/24* (2013.01); *D01D 5/30* (2013.01); *D01F 8/18* (2013.01);
(Continued)

(58) Field of Classification Search
CPC ... D01D 5/24; D01D 5/30; D01D 5/06; D01F 8/18; H01G 11/24
See application file for complete search history.

(56) References Cited

U.S. PATENT DOCUMENTS 5,458,835 A * 10/1995 Wilkes .................... A61L 15/28
264/188
7,108,907 B1 * 9/2006 Yamane ................. C08B 1/003
428/292.1
(Continued)

OTHER PUBLICATIONS

Dalton, metricsystem.net/non-si-units/accepted-for-use-with-si/dalton/, 2 pages. (Year: 2022).*

*Primary Examiner* — Emmanuel S Luk
(74) *Attorney, Agent, or Firm* — CBM PATENT CONSULTING, LLC (57) ABSTRACT

The present invention discloses a method for preparing a fiber with spatial structure, and the fiber prepared thereby and its use as well. In this method, the fiber is prepared through a wet spinning process, wherein a spinning solution prepared from low molecular weight polysaccharide based polyelectrolyte optionally with inert conductive material distributed therein, is injected through a syringe into a coagulation bath, which is formed by adding high molecular weight polysaccharide based polyelectrolyte into a coagulation tank. This method has the advantages such as simple equipment, low cost, good spinnability, and is applicable for large-scale production. The prepared fiber with spatial structure, especially the hollow multilayered fiber, has the con-
(Continued)

trollable layers, cavities, and diameter, a high tensile strength, and an ultra-high specific surface area.

15 Claims, 7 Drawing Sheets

(51) Int. Cl.
*D01D 5/30* (2006.01)
*D01F 8/18* (2006.01)
*H01G 11/24* (2013.01)
*H01G 11/36* (2013.01)

(52) U.S. Cl.
CPC ............. *H01G 11/24* (2013.01); *H01G 11/36* (2013.01); *D10B 2401/16* (2013.01)

(56) References Cited

U.S. PATENT DOCUMENTS

2009/0261498 A1* 10/2009 Rheinnecker ........... D01F 11/02
 425/71
2013/0309494 A1* 11/2013 Burgert ............... C08B 37/0072
 428/401
2015/0140055 A1* 5/2015 Schlenoff .............. A61L 15/425
 424/411

* cited by examiner

METHOD FOR PREPARING A FIBER WITH SPATIAL STRUCTURE, THE FIBER PREPARED THEREBY AND ITS USE

TECHNICAL FIELD

The invention relates to a fiber with spatial structures, particularly relates to a method for preparing fibers with multilayered structures, such as hollow multilayered structure and core-shell multilayered structure, and relates to the fiber prepared thereby and its use as well.

BACKGROUND ART

Layered structures can be found very commonly in nature. Through different weak interactions among molecular fragments, multilayered spatial structures can be spontaneously assembled and deposited in various organisms, and finally accomplish their biological functions. For example, shells and annual rings are constructed by arranging highly repetitive multilayered structures. Inspired by nature, scientists have made a great effort in the bionic design and the preparation of materials with multilayered structures, and also have carried out a lot of related theoretical researches.

Currently, materials with multilayered structures are mainly prepared by way of LBL, which is originally based on the electrostatic complexation between polyelectrolyte anion and cation to deposit alternatively layer by layer and then form a multilayered thin film, and later also based on some weak forces such as hydrogen bond, charge transfer and molecular recognition.

Additionally, the preparation of materials with multilayered structures also can be achieved by microfluidic technology. Since the reaction conditions such as reaction temperature and effective reaction time can be precisely controlled due to the fast heat transfer in the microfluidic method, the fibers with multilayered (multicavity) complex structures can be constructed.

However, actually, the fiber with multilayered structure constructed by microfluidics can only be considered as a multi-section fiber, and its size is limited to the micro-nano scale. In terms of macro-scale, the preparation of the fiber with multilayered structure still has not been realized.

Recently, linear supercapacitors have attracted more and more attention due to their small size, strong flexibility and wearable features. However, most of flexible capacitors have exposed electrodes, which easily causes the short circuit when the two electrodes are in contact with each other and consequently leads to the danger.

Conventionally, the coating technology is usually utilized to apply a layer of PVA solid electrolyte on the exposed electrodes to solve this problem, which can reduce the probability of short circuit to a certain extent.

However, the coating process is relatively complicated and time-consuming, and it is difficult to coat uniformly on the electrodes, which consequently leads to a decrease in the performance of the capacitor.

SUMMARY OF THE INVENTION

In view of the above-mentioned problems, the present invention provides a method for preparing a fiber with spatial structure, especially that with multilayered structure or core-shell structure. This method has a low cost, a simple and environmentally friendly process, and is suitable for large-scale production. The prepared fiber with multilayered structure has the controllable layers, cavities and diameter, a high tensile strength, and an ultra-high specific surface area. Therefore, it has a wide range of applications in the fields such as catalysis, adsorption, filtration and tissue engineering. The prepared fiber with core-shell structure has a inner core composed of an inert conductive material, so that it can be used as an electrode. Moreover, its outer shell is composed of a natural polysaccharide complex, which ensures that the linear electrode made of said fiber is safe and the wearable device made thereof is non-toxic.

One object of the present invention is to provide a method for preparing a fiber with spatial structure, comprising the steps of:
  I. adding low molecular weight polysaccharide based polyelectrolyte into water, and optionally dispersing inert conductive material therein, to obtain a spinning solution;
  II. adding high molecular weight polysaccharide based polyelectrolyte into water, to obtain a coagulation bath;
  III. injecting the spinning solution obtained in step I into the coagulation bath obtained in step II, to obtain the fiber with spatial structure.

Another object of the present invention is to provide the fiber with spatial structure prepared according to the above-mentioned method, including those with hollow multilayered structure and those with core-shell multilayered structure, wherein,
  the fiber with hollow multilayered structure has a single cavity or multicavities, and preferably each cavity includes one or more layers of capsule wall structure(s), and each capsule wall is preferably porous and the size of the pores on each capsule wall gradually increases from the inner layer to the outer layer when the cavity includes more layers of capsule wall structures; and
  the fiber with core-shell structure has a core of inert conductive material and a shell of polysaccharide based polyelectrolyte.

Another object of the present invention is to provide the space structure fiber for tissue engineering or for manufacturing supercapacitors, Preferably, the hollow multilayer structure fiber is used for tissue engineering applications, and cells are cultured in the fiber cavity or on the surface of each layer, Preferably, the core-shell structure fiber is used for the application of manufacturing supercapacitors.

Still another object of the present invention is to provide a use of the fiber with spatial structure for tissue engineering or for manufacturing supercapacitors, wherein,
  the fiber with hollow multilayered structure is preferably used for tissue engineering to culture cells in its cavity or on its surface of each layer, and
  the fiber with core-shell structure is preferably used for manufacturing supercapacitors.

EMBODIMENTS

The present invention will be further described in detail below through the examples and the experiments. Through these descriptions, the characteristics and advantages of the present invention will become clearer.

The present invention provides a method for preparing a fiber with spatial structure, including the steps of:
I. adding low molecular weight polysaccharide based polyelectrolyte into water, and optionally dispersing inert conductive material therein, to obtain a spinning solution;
II. adding high molecular weight polysaccharide based polyelectrolyte into water, to obtain a coagulation bath;
III. injecting the spinning solution obtained in step I into the coagulation bath obtained in step II, to obtain the fiber with spatial structure.

In one preferred embodiment, the present invention provides a method for preparing a fiber with multilayered structure, including the steps of:
I. adding low molecular weight polysaccharide based polyelectrolyte into water, to obtain a spinning;
II. adding high molecular weight polysaccharide based polyelectrolyte into water, to obtain a coagulation bath;
III. injecting the spinning solution obtained in step I into the coagulation bath obtained in step II through a syringe or a spinneret, and then coiling, washing and drying to obtain the fiber with hollow multilayered structure.

In this method, the low molecular weight polysaccharide based polyelectrolyte with positive charges can complex with the high molecular weight polysaccharide based polyelectrolyte with negative charges via the electrostatic interaction between them so as to form a polyelectrolyte complex film, and driven by the osmotic pressure, it can spontaneously pass through the complex film, further diffuse towards and then complex with the high molecular weight polysaccharide based polyelectrolyte again to form a new complex film.

The solution can be controlled to spontaneously continue the above complexation-diffusion-recomplexation process repeatly, and fibers with different amounts of capsule wall layers can be obtained.

In another preferred embodiment, the present invention provides a method for preparing a fiber with core-shell structure, including the steps of:
I. adding a low molecular weight polysaccharide based polyelectrolyte into water to obtain a first solution, and dispersing an inert conductive material into the first solution obtained in step I to obtain a spinning solution;
II. adding a high molecular weight polysaccharide based polyelectrolyte into water to obtain a coagulation bath;
III. extruding the spinning solution obtained in step I into the coagulation bath obtained in step II, to obtain the fiber with core-shell structure.

According to one preferred embodiment of the present invention, the low molecular weight polysaccharide based polyelectrolyte and the high molecular weight polysaccharide based polyelectrolyte have opposite charges, so that the electrostatic interaction between them can be achieved.

In a further preferred embodiment, the low molecular weight polysaccharide based polyelectrolyte is selected from chitosan oligosaccharides, sodium alginate oligosaccharides or carrageenan oligosaccharides.

In a still further preferred embodiment, the high molecular weight polysaccharide based polyelectrolyte is selected from chitosans, sodium alginates or carrageenans.

Among them, the chitosan oligosaccharide has positive charges, so the high molecular weight polyelectrolyte will be selected from those with opposite charges, such as sodium alginates, carrageenans or a mixture thereof; the sodium alginate oligosaccharide has negative charges, so the high molecular weight polyelectrolyte will be selected from those with opposite charges, such as chitosans; and the carrageenan oligosaccharide has negative charges, so the high molecular weight polyelectrolyte will be selected from those with opposite charges, such as chitosans.

For the following reasons, the fiber with multilayered structure prepared according to the present invention has a wide range of applications in the fields such as adsorption, filtration and tissue engineering:
i. The polysaccharide based polyelectrolytes have either positive or negative charges. Even if a complexation reaction occurs among them, there are still unreacted charged functional groups remaining on the molecular chains, which are possible to bond with positively or negatively charged ionic dyes via the electrostatic interaction and thus achieve the adsorption.
ii. The filtering performance of the fiber is attributed to its multilayered structure. Particularly, since the pore sizes of the fiber gradually decrease from the outer layers to the inner layers, when a mixture fluid containing dust particulates with different sizes enters the fiber, the larger particulates are hindered by the surface, the medium particulates are absorbed by the middle layers, and the fine particulates are blocked by the inner layers, achieving the filtration layer by layer until the requirements of use are satisfied.

iii. The application of the fiber in tissue engineering is due to the good biocompatibility of raw materials for preparing the fiber, the large specific surface area of the fiber due to its hollow structure, and the unique structure similar to blood vessel.

For the following reason, the fiber with core-shell structure prepared according to the present invention can be used for manufacturing linear flexible supercapacitors:

The inner core of the fiber is composed of an inert conductive material which has excellent conductivity, and the outer shell of the fiber is composed of a natural polysaccharide complex with a porous structure, which can protect the electrode and provide a channel for ion transmission.

According to the present invention, during the preparation of the fiber with core-shell structure, the inert conductive material is dispersed into the low molecular weight polyelectrolyte to obtain the spinning solution, and then the spinning solution is extruded into the high molecular weight polyelectrolyte coagulation bath. Since the high molecular weight polysaccharide based polyelectrolyte and the low molecular weight polysaccharide based polyelectrolyte have opposite charges, respectively, when they are in contact with each other, the positive and negative charges are closely bonded, so that a dense complex film can be formed and thus can be used as a semi-permeable membrane. Driven by the osmotic pressure, the low molecular weight polysaccharide based polyelectrolytes can spontaneously pass through the complex film to diffuse towards the high molecular weight polysaccharide based polyelectrolyte further and complex with the polyelectrolyte again to form a new complex film. The inert conductive material as an inert substance is released and remained in the core of the fiber during the diffusion of the low molecular weight polysaccharide based polyelectrolytes. Therefore, a fiber, having an inner core of inert conductive materials as the electrode and a outer shell of natural polysaccharide based polyelectrolytes as the protection layer of the electrode, can be obtained.

In a preferred embodiment according to the present invention, in step I, the low molecular weight polysaccharide based polyelectrolyte has a molecular weight of 2000 to 10000 Da.

In a further preferred embodiment, in step I, the low molecular weight polysaccharide based polyelectrolyte has a molecular weight of 2000 to 6000 Da.

If the number average molecular weight of the low molecular weight polysaccharide based polyelectrolyte is less than 2000 Da, it will have no sufficient bonding sites to complex with the high molecular weight polysaccharide based polyelectrolyte, leading to the insufficient coiling, so that the film cannot be formed, and finally not the fiber but the composite precipitate particles will be obtained. Otherwise, if the number average molecular weight of the low molecular weight polysaccharide based polyelectrolyte is greater than 10,000 Da, the complex layer formed by the electrostatic complex reaction between the low molecular weight polysaccharide based polyelectrolyte and the high molecular weight polysaccharide based polyelectrolyte will be so compact that the low molecular weight polysaccharide cannot pass through and the diffusion process is inhibited, and finally the hollow structure or the self-supporting film cannot be obtained.

In a preferred embodiment according to the present invention, in step II, the high molecular weight polysaccharide based polyelectrolyte has a molecular weight of 100,000 to 800,000 Da.

In a further preferred embodiment, in step II, the high molecular weight polysaccharide based polyelectrolyte has a molecular weight of 300,000 to 700,000 Da.

In a still further preferred embodiment, in step II, the high molecular weight polysaccharide based polyelectrolyte has a molecular weight of 400,000 to 600,000 Da.

If the molecular weight of the high molecular weight polysaccharide based polyelectrolytes exceeds the above range, the capsule wall or the outer shell of the fiber formed by the complex reaction with the low molecular weight polysaccharide based polyelectrolytes will be so compact that the low molecular weight polysaccharide based polyelectrolytes cannot pass through it, thereby inhibiting the low molecular weight polysaccharide based polyelectrolytes to diffuse further. Since the process of complex-diffusion-recomplexation cannot be carried out, finally only a fiber with one layer of compact structure can be obtained.

In a preferred embodiment according to the present invention, in step I, the spinning solution contains 5-60 wt % of the low molecular weight polysaccharide based polyelectrolyte, preferably 5-40 wt %.

In a further preferred embodiment, in step I, the spinning solution contains 5-25 wt % of the low molecular weight polysaccharide based polyelectrolyte, preferably 5-20 wt %, for example 5-10 wt %.

Through a lot of experiments, the inventors found that the concentration of the low molecular weight polysaccharide based polyelectrolyte in the spinning solution is critical to the number of layers of the prepared fibers with hollow structure. Specifically, a single-layer fiber can be changed to a multilayered fiber by increasing the concentration of the low molecular weight polysaccharide based polyelectrolyte in the spinning solution, and the number of layers of the multilayered fiber grows up with the increasing of the concentration. Thereby, according to the method of the invention, a multilayered hollow fiber with a controllable number of layers can be obtained.

Moreover, the thickness of the outer shell composed of the polysaccharide based polyelectrolyte complex layer can be affected by the concentration of the low molecular weight polysaccharide based polyelectrolyte and the inert conductive material. Specifically, the thickness of the polysaccharide based polyelectrolyte shell obtained by the complex reaction will grow up with the increasing of the concentration of the low molecular weight polysaccharide based polyelectrolyte, since more low molecular weight polysaccharide based polyelectrolytes can complex with the high molecular weight polysaccharide based polyelectrolytes. Additionally, if the concentration of the low molecular weight polysaccharide based polyelectrolyte is lower than 5 wt %, the inert conductive material cannot be well dispersed therein. Otherwise, if the concentration of the low molecular weight polyelectrolyte is too high, the shell of the obtained core-shell fiber may contain carbon nanotubes or the conductivity of the inert conductive material contained in the core will be degraded.

In a preferred embodiment according to the present invention, in step I, the weight ratio of the inert conductive material to the low molecular weight polysaccharide based polyelectrolyte in the spinning solution is 1:(0.2-100).

In a further preferred embodiment, in step I, the weight ratio of the inert conductive material to the low molecular weight polysaccharide polyelectrolyte in the spinning solution is 1:(0.5-1).

In a preferred embodiment according to the present invention, in step II, the coagulation bath contains 0.5 to 5 wt % of the high molecular weight polysaccharide based polyelectrolyte.

In a further preferred embodiment, in step II, the coagulation bath contains 0.5-3 wt % of the high molecular weight polysaccharide based polyelectrolyte, more preferably 0.5-2 wt %.

According to the present invention, the low molecular weight polysaccharide based polyelectrolyte is controlled at a higher concentration (5-60 wt % or 5-40 wt %), and the high molecular weight polysaccharide based polyelectrolyte is controlled at a lower concentration (0.5 to 5 wt %), so that the osmotic pressure can be formed due to their difference in the ion concentrations. Therefore, driven by the osmotic pressure, the low molecular weight polysaccharide based polyelectrolyte can diffuse towards the high molecular weight polyelectrolyte, and then combine with it via the electrostatic interaction, finally obtaining the fiber.

In a preferred embodiment according to the present invention, in case of no inert conductive material dispersed, in step II, NaCl is optionally added.

In a further preferred embodiment, in step II, 0.1~1M of NaCl is optionally added.

In a still further preferred embodiment, in step II, 0.2~0.5M of NaCl is optionally added.

Sodium chloride, as a small molecule electrolyte, can shield the charges of the low molecular weight polysaccharide based polyelectrolyte and the high molecular weight polysaccharide based polyelectrolyte and weaken the electrostatic interaction therebetween, so that the capsule wall structure of the fiber will be more loose, that is to say, a capsule wall structure with larger pore size can be obtained, which is useful for the multilayered hollow fiber in the application of oil absorption. Moreover, after adding sodium chloride, some of the polysaccharide based polyelectrolytes are temporarily shielded from charges, and thus some bonding sites are reserved or retained for carrying out the reaction with organic dyes. Therefore, the obtained multilayered hollow fiber will have a much better adsorption performance for organic dyes.

In a preferred embodiment according to the present invention, in step I, the pH of the spinning solution is optionally adjusted to 2-6.

Since the low and the high molecular weight polysaccharide based polyelectrolytes each have a certain acidity coefficient pKa, the charge density can be changed by adjusting the pH of the reaction system. Therefore, the electrostatic complexation between the low and the high molecular weight polysaccharide based polyelectrolytes can be affected. Specifically, the more the difference between the pH value and the acidity coefficient pKa, the greater the charge density, the stronger the bonding force between the low and the high molecular weight polysaccharide based polyelectrolytes, and the compacter the structure of the obtained complex film; otherwise, the closer the pH value is to the acidity coefficient pKa, the lower the charge density, the weaker the bonding force between the low and the high molecular weight polysaccharide based polyelectrolytes, and the looser the structure of the complex film.

In a further preferred embodiment, in step I, the pH of the spinning solution is optionally adjusted to 3.5-5.

Therefore, in said acidic environment, a multilayered fiber with looser capsule wall can be obtained, and the fiber obtained thus has a much better adsorption performance.

In a preferred embodiment according to the present invention, in step III, when the injection is carried out via a syringe, one or more syringes can be used to obtain a single-cavity or multi-cavity fiber respectively.

In a further preferred embodiment, in step III, 1 to 8 syringes are used simultaneously.

In a still further preferred embodiment, in step III, 1 to 6 syringes, for example, 1 to 3 syringes, are used simultaneously.

when a plurality of syringes are used, it is preferable to arrange them closely, so that multiple fibers injected simultaneously via the syringes can adhere together in the coagulation bath spontaneously, thereby obtaining a multi-cavity fiber. If the fibers do not adhere spontaneously, they can be arranged together manually to form the multi-cavity fiber.

In a preferred embodiment according to the present invention, in step III, when the injection is carried out via a spinneret, a single-hole or a multi-holed spinneret can be used to obtain a single-cavity or a multi-cavity fiber, respectively.

In a further preferred embodiment, a spinneret with 1 to 8 holes, more preferably 1 to 6 holes, such as 1 to 3 holes, is used.

when the spinneret is used, preferably, the distance between the adjacent holes on the spinneret is small, so that the fibers ejected via the holes can adhere to each other. If the fibers cannot spontaneously adhere, similarly, they can be arranged together manually to form the multi-cavity fiber.

In a preferred embodiment according to the present invention, in step III, after prepared, the fiber obtained is optionally immersed into a salt solution including multivalent cations, such as calcium chloride.

after the fiber is immersed in the solution including multivalent cations, the molecular chains of the fiber are cross-linked with the multivalent cations, which can change the surface roughness of the fiber and increase its strength.

In a further preferred embodiment, the concentration of the salt solution including the multivalent cations is 1-10%, preferably 3-8%, for example 5%.

In a preferred embodiment according to the present invention, in case of the inert conductive material dispersed, in step II, acetic acid is added during the preparation of the coagulation bath solution.

In a further preferred embodiment, the volume ratio of water and acetic acid added in the water bath in step II is (20-80):1.

In a preferred embodiment according to the present invention, in step III, the extrusion rate of the spinning solution is 300-600 mL/min.

In a further preferred embodiment, in step III, the extrusion rate of the spinning solution is 400-500 mL/min.

Through a lot of experiments, the inventors found that the extrusion rate of the spinning solution is critical to the formability of the fiber.

In a preferred embodiment according to the present invention, in case of the inert conductive material dispersed, in step III, the coagulation bath is optionally rotated.

In a further preferred embodiment, in step III, in case of the coagulation bath rotated, the extrusion direction of the spinning solution is preferably perpendicular to the rotation direction of the coagulation bath.

In a further preferred embodiment, in step III, in case of the coagulation bath rotated, the rotation rate of the coagulation bath is 80-200 rpm/min, preferably 100-180 rpm/min, more preferably 120-160 rpm/min.

Through a lot of experiments, the inventors found that the rotation of the coagulation bath is contributed to the forming of fibers. Specifically, since the spinning solution is vertically extruded into the rotating coagulation bath containing the high molecular weight polysaccharide based polyelectrolyte, the rotating coagulation bath provides the extruded spinning solution with a shear force in the tangential direction of rotation, which is contributed to the forming of fibers.

In a second aspect, the present invention provides a fiber with spatial structure prepared by the method as described in the first aspect, such as a fiber with hollow multilayered structure or a fiber with core-shell structure.

In an preferred embodiment according to the present invention, the fiber with hollow multilayered structure includes one or more cavity (cavities). In a further preferred embodiment, each cavity of the fiber includes one or more layer(s) of capsule wall(s). In a still further preferred embodiment, each layer of the capsule wall is porous, and when the cavity includes more layers, the pore sizes of the capsule walls gradually decrease from the outer layers to the inner layers.

Specifically, according to the method of the present invention, the structure comprising a plurality of capsule walls is obtained, and the pore sizes of the capsule walls in this structure monotonically increase from the inner layers to the outer layers.

The fiber with core-shell structure has a inner core composed of inert conductive materials and a outer shell composed of polysaccharide based polyelectrolytes.

In a third aspect, the present invention provides a use of the fiber with spatial structure as described in the second aspect, such as the fiber with hollow multilayered structure and the fiber with core-shell structure.

In a preferred embodiment according to the present invention, the fiber with hollow multilayered structure is used for tissue engineering.

In a further preferred embodiment, the fiber is used for cell culturing, for example, cells being cultured in the cavity of the fiber or on the surface of each layer of the fiber.

In a still further preferred embodiment, cells are cultured in the cavity of the fiber, and, if the fiber has a plurality of cavities, different kinds of cells can be cultured at the same time in different cavities of the fiber.

In a preferred embodiment according to the present invention, the fiber with core-shell structure is used for manufacturing supercapacitors.

In a preferred embodiment according to the present invention, the supercapacitors are manufactured as follows:
  step I. blending water and phosphoric acid homogeneously to obtain a solution A;
  step II. dissolving PVA (polyvinyl alcohol) into water to obtain a solution B;
  step III. mixing the solution B with the solution A and then stirring to obtain a solution C;
  step IV. coating the solution C on the fiber with core-shell structure as described in the second aspect of the present invention to produce the supercapacitor.

The beneficial effects of the present invention are as follows:
  (1) According to the method of present invention, the fiber can be easily prepared under normal temperature and pressure, and thereby the processing parameters are easy to control and the production efficiency is higher;
  (2) According to the method of present invention, the fiber with single-layer structure or multilayered structure can be prepared, and more importantly, gradient variety of pore sizes, number of layers, compositions and number of cavities of the fiber can be adjusted and controlled as desired;
  (3) The fiber with hollow multilayered structure prepared according to the method of present invention has good tensile strength, ultra-high specific surface area, and has a wide range of applications in the fields of catalysis, adsorption, filtration and tissue engineering;
  (4) Since the fiber with core-shell structure prepared according to the method of the present invention has an inner core composed of inert conductive materials and a outer shell composed of natural polyelectrolyte complexes, the thickness of the shell can be increased by increasing the concentration of the low molecular weight natural polyelectrolyte;
  (5) The fiber with core-shell structure prepared according to the method of the present invention can be used as a flexible capacitor, and the polysaccharide based polyelectrolyte complex wrapped as the outer layer is useful for preventing the two electrodes from contacting with each other, which greatly improves the safety;
  (6) As the outer layer of the fiber with core-shell structure prepared according to the method of the present invention, the polysaccharide based polyelectrolyte complex has lots of pores, which can provide channels for the electrolyte ion transmission, and additionally, the natural and degradable polysaccharide based polyelectrolytes are non-toxic and harmless to be used for wearable devices.

EXAMPLES

Hereinafter, the present invention will be further described by following examples. However, the examples are only exemplary and should not be considered as any limitation to the scope of the present invention.

Example 1

Figure 1:
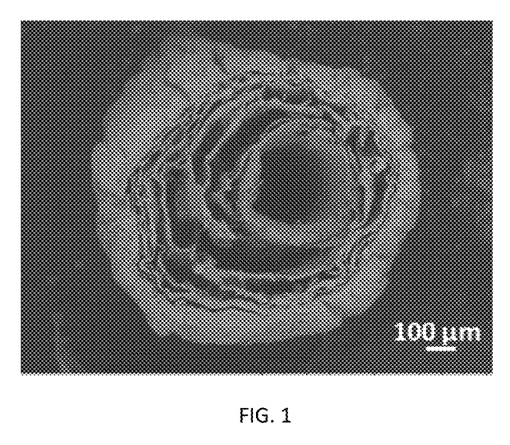
FIG. 1 shows an electron micrograph of the sodium alginate/chitooligosaccharide multilayered fiber prepared in Example 1 (mainly showing the overall cross-section of the fiber)
Figure 2:
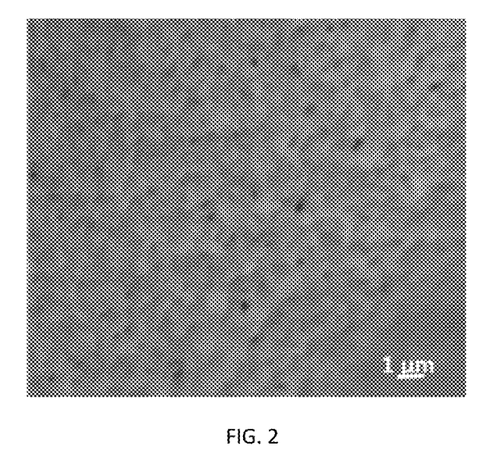
FIG. 2 shows one of the electron micrographs of the sodium alginate/chitooligosaccharide multilayered fiber prepared in Example 1 (mainly showing the outer surface near the first layer of the hollow core)
Figure 3:
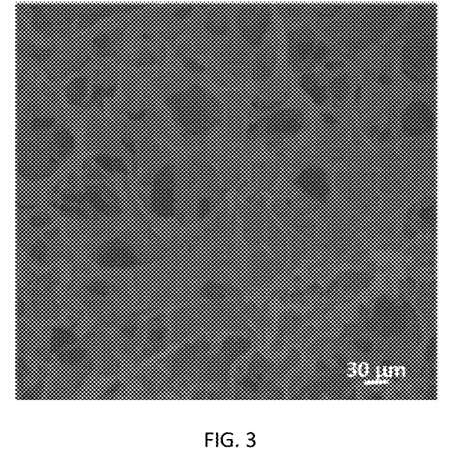
FIG. 3 shows the third electron micrograph of the sodium alginate/chitooligosaccharide multilayered fiber prepared in Example 1 (mainly showing the outer surface near the outermost layer of the hollow core)
Figure 4:
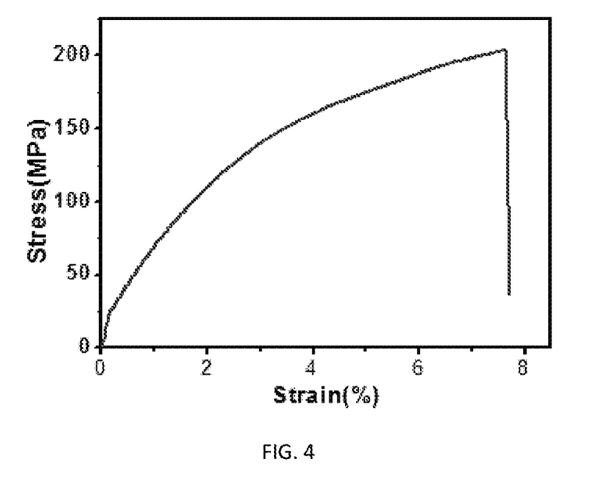
FIG. 4 shows the tensile strength of the sodium alginate /chitooligosaccharide multilayered fiber prepared in Example 1.

Chitooligosaccharid with a molecular weight of 2000 Da and sodium alginate with a molecular weight of 300,000 Da were weighed according to the mass ratio of 20:1. The chitooligosaccharid weighed was dissolved with deionized water and a spinning solution with a concentration of 20 wt % was thus obtained. The sodium alginate weighed was added to a solution of 1.17% sodium chloride (0.2M NaCl) to prepare a coagulation bath with a concentration of 1 wt %. The spinning solution was injected into the coagulation bath via a syringe to carry out the diffusion reaction, and after the processes of coiling, washing and drying, the polysaccharide based polyelectrolyte hollow fiber was obtained. The electron microscope observation and the strength test on the obtained fibers were achieved and the results are shown in FIGS. 1-4:
  (1) FIG. 1 shows the overall cross section of the hollow multilayered fiber. Specifically, it can be seen that the prepared fiber has a hollow multilayered structure with a diameter of about 900 μm and about 9 layers;
  (2) FIG. 2 mainly shows the outer surface of the first layer close to the hollow core. Specifically, it can be seen that the first layer close to the hollow core of the prepared chitooligosaccharide/sodium alginate fiber has an outer surface with pores of about 100 nm;
  (3) FIG. 3 mainly shows the outer surface close to the outermost layer. Specifically, it can be seen that the outer surface close to the outermost layer of the prepared fiber has pores of about 50 μm;

(4) The tensile strength of the obtained hollow multilayered fiber was tested and the result was as shown in FIG. 4. It can be seen from the figure that the tensile strength of the fiber is 203 MPa and the elongation rate is up to 7.7%.

Example 2

The first example was repeated with the only difference being the number of syringes was 2 and the concentration of the spinning solution was 10 wt %. In this example, two fibers ejected were drawn together in the coagulation bath to obtain the chitooligosaccharide/sodium alginate fiber.

Figure 5:
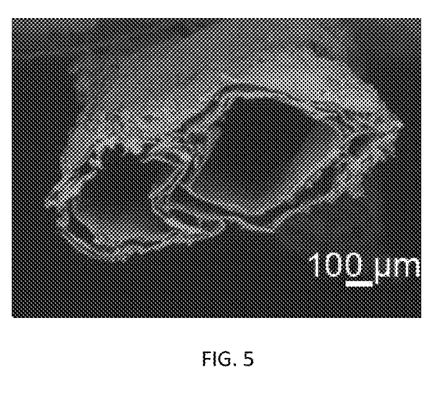
FIG. 5 shows an electron micrograph of the sodium alginate /chitooligosaccharide multilayered fiber prepared in Example 2 (mainly showing the overall cross-section of the fiber)

The fiber obtained was examined by electron microscope. It was found from FIG. 5 that the chitooligosaccharide/sodium alginate fiber had a hollow multilayered multi-cavity structure and the number of cavities was 2.

Example 3

The second example was repeated with the only difference being the number of syringes was 3.

Figure 6:
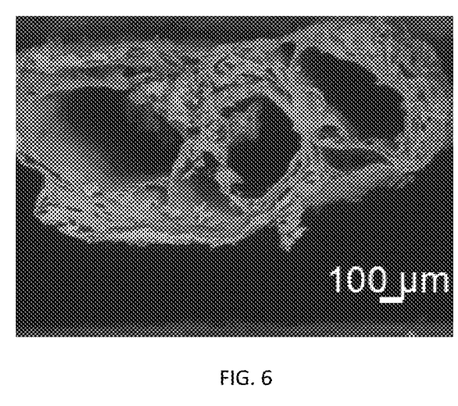
FIG. 6 shows an electron micrograph of the sodium alginate /chitooligosaccharide multilayered fiber prepared in Example 3 (mainly showing the overall cross-section of the fiber)

The fiber obtained was examined by electron microscope. It was found from FIG. 6 that the chitooligosaccharide/sodium alginate fiber had a hollow multilayered multi-cavity structure and the number of cavities was 3.

Example 4

The third example was repeated with the only difference being the number of syringes was 4.

Figure 7:
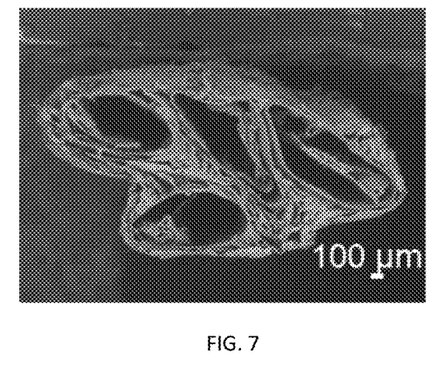
FIG. 7 shows an electron micrograph of the sodium alginate /chitooligosaccharide multilayered fiber prepared in Example 4 (mainly showing the overall cross-section of the fiber)

The fiber obtained was examined by electron microscope. It was found from FIG. 7 that the chitooligosaccharide/sodium alginate fiber had a hollow multilayered multi-cavity structure and the number of cavities was 4.

Example 5

Carrageenan oligosaccharide with a molecular weight of 2000 Da and chitosan with a molecular weight of 750,000 Da were weighed according to the mass ratio of 10:1. The carrageenan oligosaccharide weighed was dissolved with deionized water and the pH value was adjusted to 4.8, and thus a spinning solution A with a concentration of 10 wt % was obtained. The chitosan weighed was added to deionized water and acetic acid (with a volume ratio of 50:1) to prepare a coagulation bath B with a concentration of 1 wt %. The spinning solution A was injected into the coagulation bath B via a syringe to carry out the diffusion reaction, and after the processes of coiling, washing, drying, the polysaccharide based polyelectrolyte hollow multilayered fiber was obtained.

The obtained fiber was examined by electron microscope, and it was found that the prepared carrageenan oligosaccharide/chitosan fiber had a hollow multilayered structure with a diameter of about 400 μm and 4 layers.

Example 6

Chitooligosaccharide with a molecular weight of 3000 Da and carrageenan with a molecular weight of 200,000 Da were weighed according to the mass ratio of 40:1. The chitooligosaccharide weighed was dissolved with deionized water, and thus a spinning solution A with a concentration of 20 wt % was obtained. The carrageenan weighed was added to deionized water and acetic acid (with a volume ratio of 50:1) to prepare a coagulation bath B with a concentration of 1 wt %. The spinning solution A was injected into the coagulation bath B via a syringe to carry out the diffusion reaction, and after the processes of coiling, washing, drying, the hollow multilayered fiber was obtained.

The obtained fiber was examined by electron microscope, and it was found that the prepared fiber had a hollow multilayered structure with a diameter of about 1 mm and 8 layers.

Example 7

Sodium alginate with a molecular weight of 300,000 Da and carrageenan with a molecular weight of 200,000 Da were weighed according to the mass ratio of 1:3, and chitooligosaccharide with a molecular weight of 3000 Da was weighed as well. The chitooligosaccharide weighed was dissolved with deionized water, and thus a spinning solution A with a concentration of 20 wt % was obtained. The sodium alginate and the carrageenan weighed were added to deionized water to prepare a coagulation bath B with sodium alginate concentration of 1 wt %. The spinning solution A was injected into the coagulation bath B via a syringe to carry out the diffusion reaction, and after the processes of coiling, washing, drying, the polysaccharide based polyelectrolyte hollow fiber was obtained.

The obtained fiber was examined by electron microscope, and it was found that the prepared chitooligosaccharide/(sodium alginate/carrageenan)fiber had a hollow multilayered structure with a diameter of about 1 mm and 10 layers.

Example 8

The first example was repeated with the difference being: (1) the chitooligosaccharid with a molecular weight of 2000 Da was replaced by a chitooligosaccharid with a molecular weight of 6000 Da, and a spinning solution with a concentration of 5 wt % was prepared; (2) the sodium alginate with a molecular weight of 300,000 Da was replaced by a sodium alginate with a molecular weight of 700,000 Da, and a coagulation bath with a concentration of 2 wt % was prepared.

Example 9

Chitooligosaccharid with a molecular weight of 2000 Da, carbon nanotubes with a length of 50 μm, and sodium alginate with a molecular weight of 300,000 Da were weighed according to the mass ratio of 5:5:1. The chitooligosaccharid weighed was dissolved with deionized water, and thus a first solution with a concentration of 5 wt % was obtained. Then, multi-walled carbon nanotubes were added, and after stirring and ultrasonic dispersing, a spinning solution of chitooligosaccharides/carbon nanotubes was obtained. The sodium alginate weighed was added and dissolved into deionized water, and thus a coagulation bath with a concentration of 1 wt % was obtained. The spinning solution was contained in a syringe and then injected into the sodium alginate coagulation bath solution. The injection speed of the syringe was adjusted to 500 mL/min, and the rotation speed of the coagulation bath was set to 120 rpm/min.

Figure 10:
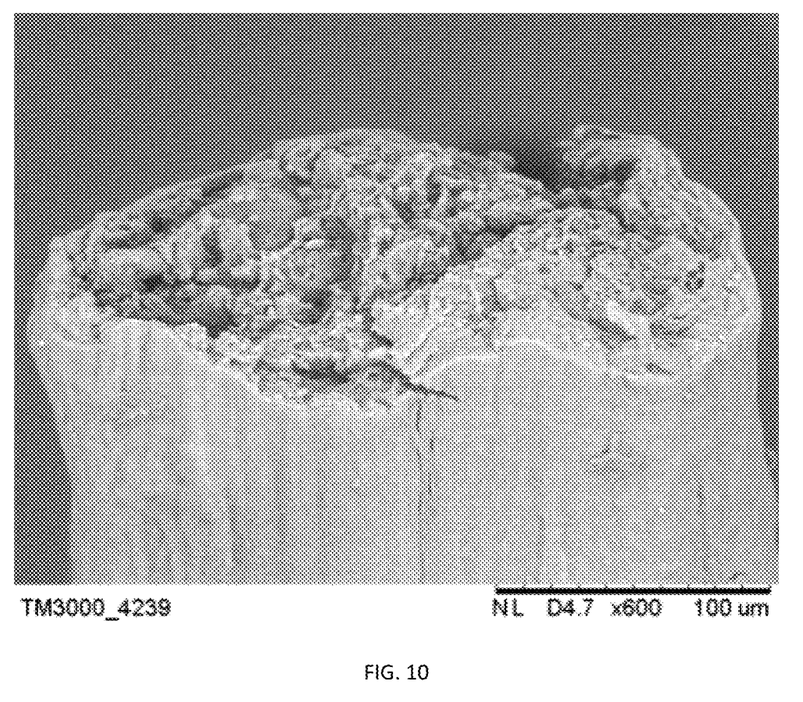
FIG. 10 shows one of the electron micrographs of the sodium alginate /(chitooligosaccharide/carbon nanotube) fiber prepared in Example 1 (mainly showing the overall cross-section of the fiber)
Figure 11:
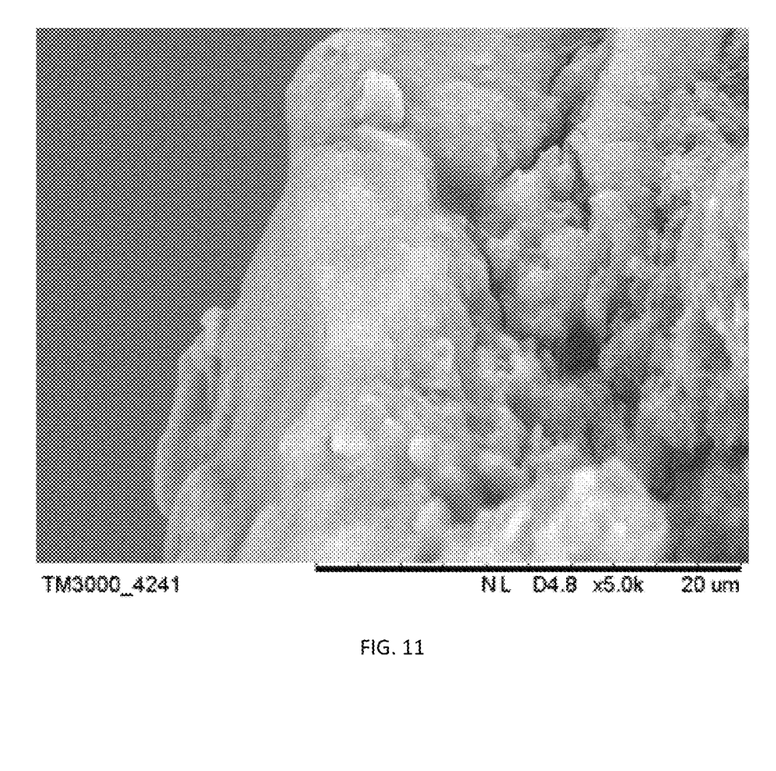
FIG. 11 shows the second electron micrograph of the sodium alginate /(chitooligosaccharide/carbon nanotube) fiber prepared in Example 1 (mainly showing the core-shell structure of the fiber)
Figure 12:
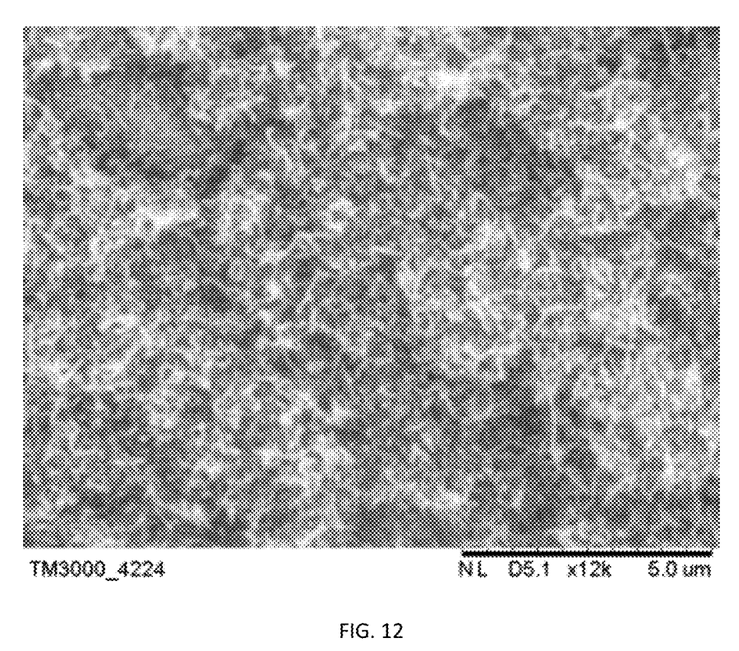
FIG. 12 shows the third electron micrograph of sodium alginate /(chitooligosaccharide/carbon nanotube) fiber prepared in Example 1 (mainly showing the morphology of the inner core of the fiber)

The obtained fibers were examined by electron microscope, and the results were shown in FIGS. 10-12. It can be seen that the prepared (chitooligosaccharid /carbon nanotubes)/sodium alginate fiber had a core-shell structure, wherein the core was composed of the carbon nanotubes and the outer layer was composed of the polysaccharide based polyelectrolyte complex.

Example 10

The ninth example was repeated with the difference being: chitooligosaccharid with a molecular weight of 2000 Da, carbon nanotubes with a length of 50 μm, and sodium alginate with a molecular weight of 300,000 Da were weighed according to the mass ratio of 12:24:1.

The obtained fiber was examined by electron microscope. It can be seen that the prepared (chitooligosaccharide/carbon nanotube)/sodium alginate fiber had a core-shell structure, and the thickness of the outer capsule wall of the fiber was 4 μm.

Example 11

Sodium alginate oligosaccharide with a molecular weight of 2000 Da, carbon nanotubes with a length of 50 μm, and chitosan with a molecular weight of 750,000 Da were weighed according to the mass ratio of 5:10:1. The sodium alginate oligosaccharide weighed was dissolved with deionized water, and thus a first solution with a concentration of 5 wt % was obtained. Then, multi-walled carbon nanotubes were added, and after stirring and ultrasonic dispersing, a spinning solution of sodium alginate oligosaccharide/carbon nanotubes was obtained. The chitosan weighed was added to deionized water and acetic acid (with a volume ratio of 50:1) to prepare a coagulation bath with a concentration of 1 wt %. The spinning solution contained in a syringe was injected into the chitosan coagulation bath solution to carry out the reaction. The injection speed of the syringe was adjusted to 500 mL/min, and the rotation speed of the coagulation bath was set to 120 rpm/min.

The obtained fibers were examined by electron microscope. It can be seen that the prepared (sodium alginate oligosaccharide/carbon nanotubes)/chitosan fiber had a core-shell structure, wherein the core was composed of the carbon nanotubes and the outer layer was composed of the polysaccharide based polyelectrolyte complex.

Example 12

Carrageenan oligosaccharide with a molecular weight of 2000 Da, carbon nanotubes with a length of 50 μm, and chitosan with a molecular weight of 750,000 Da were weighed according to the mass ratio of 18:18:1. The carrageenan oligosaccharide weighed was dissolved with deionized water, and thus a first solution with a concentration of 18 wt % was obtained. Then, multi-walled carbon nanotubes were added, and after stirring and ultrasonic dispersing, a spinning solution of carrageenan oligosaccharide/carbon nanotubes was obtained. The chitosan weighed was added to deionized water and acetic acid (with a volume ratio of 50:1) to prepare a coagulation bath with a concentration of 1 wt %. The spinning solution contained in a syringe was injected into the chitosan coagulation bath solution. The injection speed of the syringe was adjusted to 500 mL/min, and the rotation speed of the coagulation bath was set to 120 rpm/min.

The obtained fibers were examined by electron microscope. It can be seen that the prepared (carrageenan oligosaccharide/carbon nanotubes)/chitosan fiber had a core-shell structure, wherein the core was composed of the carbon nanotubes and the outer layer was composed of the polysaccharide based polyelectrolyte complex.

Example 13

The ninth example was repeated with the difference being: the carbon nanotubes were replaced by graphene.

The obtained fibers were examined by electron microscope. It can be seen that the fiber had a core-shell structure, wherein the core was composed of the graphene and the outer layer was composed of the polysaccharide based polyelectrolyte complex.

COMPARATIVE EXAMPLES

Comparative Example 1

The first example was repeated with the difference being: the concentration of sodium alginate in the coagulation bath was very low, only 0.1 wt %.

It was found that when the concentration of sodium alginate (high molecular weight polyelectrolyte) was very low, the precipitate would be formed. Since the binding among sodium alginate chains and the binding between sodium alginate and chitooligosaccharide were insufficient, there were not enough binding sites between sodium alginate and chitooligosaccharide to form a film but the precipitate was formed.

Comparative Example 2

The first example was repeated with the difference being: the concentration of sodium alginate in the coagulation bath was 0.4%, which was lower than that in Example 1, but higher than that in Comparative Example 1.

It was found that fibers can be formed due to sufficient binding and crosslinking compared to Comparative Example 1. However, compared to Example 1, the fiber obtained was very fragile.

Comparative Example 3

The ninth example was repeated with the difference being: the concentration of sodium alginate in the spinning solution was very low, only 0.1 wt %.

It was found that when the concentration of sodium alginate (high molecular weight polyelectrolyte) was very low, the precipitate would be formed. Since the binding among sodium alginate chains and the binding between sodium alginate and chitooligosaccharide were insufficient, there were not enough binding sites between sodium alginate and chitooligosaccharide to form a fiber but the precipitate was formed.

EXPERIMENTAL EXAMPLES

Experimental Example 1 Infrared Detection

Figure 8:
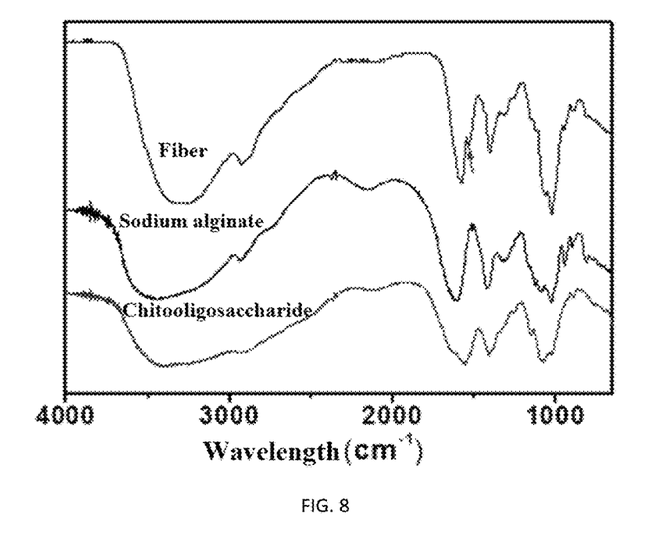
FIG. 8 shows an infrared spectrograph of the sodium alginate /chitooligosaccharide multilayered fiber prepared in Example 1.

The hollow multilayered fiber obtained in Example 1 was subjected to the infrared detection and the result was shown in FIG. 8. As can be seen in the figure, compared with pure chitooligosaccharide and sodium alginate, there was a new peak in the amide II zone at 1540 $cm^{-1}$ for the fiber, which indicated that the electrostatic complexation reaction between the amine group of chitooligosaccharide and the carboxyl group of alginate was completed successfully.

Experimental Example 2 Cell Culturing

Figure 9:
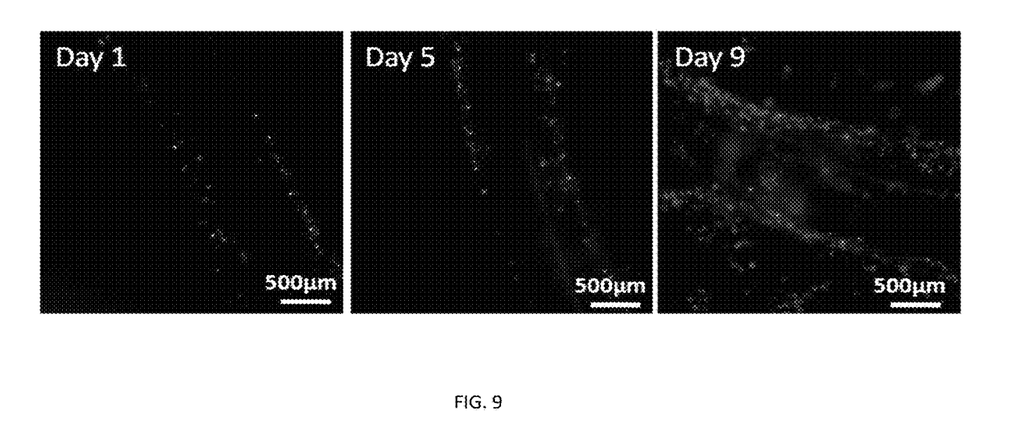
FIG. 9 shows a DAPI fluorescence image of cells cultured on the sodium alginate/chitooligosaccharide multilayered fiber prepared in Example 2.

The multi-cavity hollow multilayered fiber obtained in Example 2 was used as a template for cell culturing, and the result was shown in FIG. 9. As can be seen in the figure, cells proliferated over time.

Figure 13:
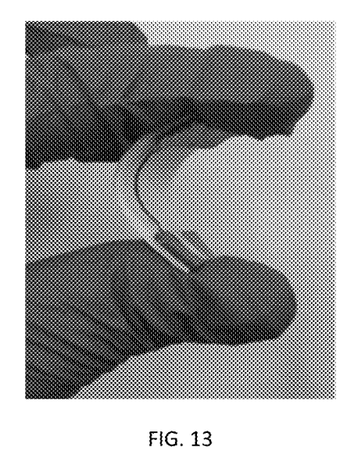
FIG. 13 shows a macroscopic view of the linear capacitor derived from the assembling of sodium alginate/(chitooligosaccharide/carbon nanotube) fibers prepared in Example 1.

Experimental Example 3 Assembly of Linear Supercapacitors 10 mL of water and 10 mL of phosphoric acid were mixed uniformly and a solution A was obtained. PVA was dissolved in 90 mL of water at 90° C. and a solution B was obtained. Then, the solution B was mixed with the solution A, and after stirring evenly, a solution C was obtained. The solution C was applied to the fiber with core-shell structure of Example 9, and a supercapacitor was achieved as shown in FIG. 13.

The present invention has been described in detail in combination with preferred embodiments and exemplary examples. However, it should be noted that these embodiments are merely illustrative for the present invention and do not constitute any limitation to the scope of the present invention. Within the spirit and the scope of the present invention, various improvements, equivalent substitutions or modifications can be made to the technical content of the present invention and its embodiments, all of which fall in the scope of the present invention. The scope of the present invention is subject to the appended claims.

What is claimed is:

1. A method for preparing a fiber with spatial structure, comprising the steps of:
   I. adding a low molecular weight polysaccharide-based polyelectrolyte into water, and optionally dispersing inert conductive material therein, to obtain a spinning solution, wherein the low molecular weight polysaccharide-based polyelectrolyte has a molecular weight of 2000-10000 Da;
   II. adding a high molecular weight polysaccharide-based polyelectrolyte into water, to obtain a coagulation bath, wherein the high molecular weight polysaccharide-based polyelectrolyte has a molecular weight of 100,000-800,000 Da; and
   III. injecting the spinning solution obtained in the step I into the coagulation bath obtained in the step II, to obtain the fiber with spatial structure;
   wherein the low molecular weight polysaccharide-based polyelectrolyte and the high molecular weight polysaccharide-based polyelectrolyte have opposite charges;
   wherein the fiber with hollow multilayered structure has a single cavity or multicavities, and each cavity includes one or more layers of capsule wall structure (s), and each capsule wall is porous and the size of the pores on each capsule wall gradually increases from the inner layer to the outer layer when the cavity includes more layers of capsule wall structures; and the fiber with core-shell structure has a core of inert conductive material and a shell of polysaccharide based polyelectrolyte.

2. The method according to claim 1, wherein:
   the fiber with spatial structure includes those with hollow multilayered structure and those with core-shell multilayered structure, and wherein, in case of no inert conductive material dispersed in the step I, the fiber with hollow multilayered structure is obtained in the step III, by injecting the spinning solution obtained in the step I into the coagulation bath obtained in the step II through a syringe or a spinneret, and then being subjected to the treatments of coiling, washing and drying; the inert conductive material dispersed in the step I, the fiber with core-shell multilayered structure is obtained in the step III, and the weight ratio of the inert conductive material to the low molecular weight polysaccharide based polyelectrolyte in the spinning solution is 1:(0.2-100), and the inert conductive material is selected from the group consisting of graphene, carbon nanotube and metal ultrafine powder.

3. The method according to claim 2, wherein:
   in case of no inert conductive material dispersed, in the step II, the pH of the spinning solution is adjusted to 2-6and/or 0.1-1M NaCl solution is added; and in the step III, when the injection is carried out via a syringe, one or more syringes can be used to obtain a single-cavity or multi-cavity fiber respectively, and when the injection is carried out via a spinneret, a single-hole or multi-holed spinneret can be used to obtain a single-cavity or multi-cavity fiber, respectively.

4. The method according to claim 3, wherein the pH of the spinning solution is adjusted to 3.5-5, and/or 0.2-0.5M NaCl solution is added.

5. The method according to claim 2, wherein:
   in case of the inert conductive material dispersed, in the step III, the extrusion rate of the spinning solution is 300-600 mL/min.

6. The method according to claim 5, wherein the inert conductive material dispersed in the step III, the extrusion rate of the spinning solution is 400-500 mL/min.

7. The method according to claim 2, wherein the weight ratio of the inert conductive material to the low molecular weight polysaccharide-based polyelectrolyte in the spinning solution is 1:(0.5-1).

8. The method according to claim 1, wherein:
   the low molecular weight polysaccharide-based polyelectrolyte of the step I has a molecular weight of 2000-6000 Da; and/or the low molecular weight polysaccharide-based polyelectrolyte is selected from the group consisting of chitosan oligosaccharide, sodium alginate oligosaccharides and carrageenan oligosaccharide.

9. The method according to claim 1, wherein:
   the high molecular weight polysaccharide-based polyelectrolyte of the step II has a molecular weight of 300,000-700,000 Da; and/or the high molecular weight polysaccharide-based polyelectrolyte is selected from the group consisting of chitosan, sodium alginate and carrageenans.

10. The method according to claim 9, wherein the high molecular weight polysaccharide-based polyelectrolyte has a molecular weight of 400,000-600,000 Da.

11. The method according to claim 1, wherein:
    in the spinning solution of the step I, the low molecular weight polysaccharide-based polyelectrolyte has a concentration of 5-60 wt %; and/or in the coagulation bath of the step II, the high molecular weight polysaccharide based-polyelectrolyte has a concentration of 0.5-5 wt %.

12. The method according to claim 11, wherein the low molecular weight polysaccharide-based polyelectrolyte has a concentration of 5-40 wt %; and the high molecular weight polysaccharide-based polyelectrolyte has a concentration of 0.5-3 wt %.

13. The method according to claim 12, wherein the low molecular weight polysaccharide-based polyelectrolyte has a concentration of 5-20; and the high molecular weight polysaccharide-based polyelectrolyte has a concentration of 0.5-2 wt %.

14. A process for utilizing the fiber with spatial structure according to claim 1 for tissue engineering or for manufacturing supercapacitors, wherein the fiber with hollow multilayered structure is used for tissue engineering to culture cells in its cavity or on its surface of each layer, and the fiber with core-shell structure is used for manufacturing supercapacitors.

15. The process according to claim 14, wherein,
the supercapacitors are manufactured as follows:
step I. blending water and phosphoric acid homogeneously to obtain a solution A;
step II. dissolving PVA into water to obtain a solution B;
step III. mixing the solution B with the solution A and then stirring to obtain a solution C;
step IV. coating the solution C on the fiber with core-shell structure to produce the supercapacitor.

* * * * *